UNITED STATES PATENT OFFICE.

DAVID M. PERINE, OF NEW YORK, N. Y.

PRESERVATION OF MINERAL WATER.

1,160,317.  Specification of Letters Patent.  Patented Nov. 16, 1915.

No Drawing.  Application filed December 30, 1914. Serial No. 879,685.

*To all whom it may concern:*

Be it known that I, DAVID M. PERINE, a citizen of the United States of America, residing in the city, county, and State of New York, have invented a certain new and useful Improvement in the Preservation of Mineral Water, of which the following is a true and exact description.

The object of my present invention is to provide a practical and effective method of preserving, and thereby making it possible to store and transport, certain natural spring and like mineral waters prized for their medicinal properties, but which have hitherto been available only at their place of origin because of the deterioration of the waters occurring shortly after their withdrawal from the ground.

My present invention was primarily devised for use in connection with a well known natural spring water shown by analysis to have the following composition.

| | |
|---|---|
| Chlorid of sodium | 0.789 grains |
| Sulfate of potassium | 0.223 " |
| Sulfate of sodium | 0.416 " |
| Sulfate of calcium | 3.271 " |
| Sulfate of magnesium | 2.304 " |
| Bi-carbonate of calcium | 19.201 " |
| Bi-carbonate of magnesium | 17.614 " |
| Bi-carbonate of iron | 0.153 " |
| Alumina | 0.115 " |
| Silica | 0.242 " |
| Organic matter | 0.569 " |

This water which is widely known for its medicinal properties both for internal use and for use as a bathing fluid, loses its desirable properties in a few hours after being drawn from the ground and stored either in open pools, or vessels, or in bottles or other sealed receptacles. The water so stored also changes in appearance from a clear colorless liquid to a bright yellow liquid.

I have found the deterioration of this water to comprise the breaking down or chemical conversion of some of the salts originally held in solution in the water, accompanied by the escape of a small amount of carbonic acid gas and the formation of certain precipitates. I have found that this deterioration can be prevented with a water of the general kind or type indicated by the analysis given above, by, and my invention consists in charging the water under a moderate pressure with carbon dioxid, immediately after the water has been withdrawn from the ground and before the liberation of carbon dioxid from the water has been considerable, and then storing the water in suitable receptacles sealed to prevent the liberation of either the natural or added carbon dioxid. The water so treated can be transported and stored for considerable periods without any deterioration whatever.

Having now described my invention, what I claim as new and desire to secure by Letters Patent is:

The method of preserving and storing natural mineral water of a kind which on exposure to the air, gives off carbonic acid and precipitates mineral substances held in solution in the natural condition of the water, consisting in charging the water with carbonic oxid prior to the escape of any considerable portion of the carbonic oxid which would be given off by the water on a prolonged exposure to the air, and storing the charged water in sealed receptacles under pressure to retain the added carbonic oxid in solution.

DAVID M. PERINE.

Witnesses:
 CHARLES W. GLENN, Jr.,
 L. A. B. PLETSCHER.